United States Patent
Shiosaki et al.

(10) Patent No.: US 9,431,668 B2
(45) Date of Patent: Aug. 30, 2016

(54) POWER GENERATION SYSTEM AND OPERATION METHOD THEREOF

(75) Inventors: Keisuke Shiosaki, Osaka (JP); Hiroshi Tatsui, Shiga (JP); Junji Morita, Kyoto (JP); Akinori Yukimasa, Osaka (JP); Hidetoshi Wakamatsu, Shiga (JP); Atsutaka Inoue, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 572 days.

(21) Appl. No.: 13/990,327

(22) PCT Filed: Apr. 26, 2012

(86) PCT No.: PCT/JP2012/002884
§ 371 (c)(1),
(2), (4) Date: May 29, 2013

(87) PCT Pub. No.: WO2012/153482
PCT Pub. Date: Nov. 15, 2012

(65) Prior Publication Data
US 2013/0252125 A1 Sep. 26, 2013

(30) Foreign Application Priority Data

May 6, 2011 (JP) ................................. 2011-103421
May 6, 2011 (JP) ................................. 2011-103422

(51) Int. Cl.
*H01M 8/04* (2016.01)
*F23L 17/00* (2006.01)

(52) U.S. Cl.
CPC ........ *H01M 8/04223* (2013.01); *F23L 17/005* (2013.01); *H01M 8/04022* (2013.01); *H01M 8/04761* (2013.01); *H01M 8/04776* (2013.01); *H01M 2250/10* (2013.01); *Y02B 90/14* (2013.01); *Y02E 60/50* (2013.01)

(58) Field of Classification Search
None
See application file for complete search history.

(56) References Cited

U.S. PATENT DOCUMENTS

2006/0257707 A1* 11/2006 Kaschmitter ..... H01M 8/04216
429/412

FOREIGN PATENT DOCUMENTS

DE          10000406    *   7/2000
JP         2002-349844 A    12/2002
(Continued)

OTHER PUBLICATIONS

International Search Report issued in International Patent Application No. PCT/JP2012/002884 mailed on Aug. 7, 2012.

*Primary Examiner* — Jonathan Crepeau
(74) *Attorney, Agent, or Firm* — McDermott Will & Emery LLP

(57) ABSTRACT

A power generation system of the present invention comprises a fuel cell system (101), a gas supply device, a controller (102), a combustion device (103), an exhaust passage (70), a gas passage used to supply a gas supplied from the gas supply device to the exhaust passage (70), and a back-flow preventing device (20) placed in the gas passage or the exhaust passage (70), and the controller (102) executes an operation for relieving a state in which a valve element remains incapable of moving away from a valve seat in the back-flow preventing device (20) in such a manner that the gas supply device is operated so that a differential pressure between an upstream side and a downstream side of the back-flow preventing device (20) becomes a value equal to or greater than the predetermined time which can relieve the state in which valve element remains incapable of moving away from the valve seat, during a shut-down state or at start-up of the fuel cell system (101).

10 Claims, 7 Drawing Sheets

(56) References Cited

FOREIGN PATENT DOCUMENTS

| | | |
|---|---|---|
| JP | 2005-063697 A | 3/2005 |
| JP | 2006-073446 A | 3/2006 |
| JP | 2007-095542 A | 4/2007 |
| JP | 2007-248009 A | 9/2007 |
| JP | 2008-135267 A | 6/2008 |
| JP | 2008-159460 A | 7/2008 |
| JP | 2008-210631 A | 9/2008 |
| JP | 2008-311066 A | 12/2008 |

* cited by examiner

POWER GENERATION SYSTEM AND OPERATION METHOD THEREOF

RELATED APPLICATIONS

This application is the U.S. National Phase under 35 U.S.C. §371 of International Application No. PCT/JP2012/002884, filed on Apr. 26, 2012, which in turn claims the benefit of Japanese Application No. 2011-103421, filed on May 6, 2011, and Japanese Application No. 2011-103422, filed on May 6, 2011, the disclosures of which Applications are incorporated by reference herein.

TECHNICAL FIELD

The present invention relates to a power generation system which supplies heat and electricity and an operation method thereof.

BACKGROUND ART

A cogeneration system is a system which supplies electric power generated in power generation to a customer to cover a power load of the customer, and recovers and stores exhaust heat resulting from the power generation to cover a hot water load of the customer. As such a cogeneration system, there is known a cogeneration system in which a fuel cell and a hot water supply device are configured to operate using the same fuel (e.g., see Patent Literature 1). The cogeneration system disclosed in Patent Literature 1 includes a fuel cell, a heat exchanger for recovering heat generated by an operation of the fuel cell, a hot water storage tank for storing water heated after it has circulated through the heat exchanger, and a hot water supply device for heating the water flowing out of the hot water storage tank up to a predetermined temperature, and is configured such that the fuel cell and the hot water supply device operate using the same fuel.

There is also known a fuel cell power generation apparatus intended to improve an exhaust performance of the fuel cell power generation apparatus placed inside of a building (e.g., see Patent Literature 2). The power generation apparatus disclosed in Patent Literature 2 is a fuel cell power generation apparatus installed and used inside of a building having an intake port. The power generation apparatus includes an air introduction port through which air is guided from inside of the building to inside of the fuel cell power generation apparatus, an air exhaust pipe through which the air inside of the fuel cell power generation apparatus is exhausted to outside of the building, and a ventilation means. The ventilation means guides the air outside of the building to inside of the building via the intake port, then introduces the air to inside of the fuel cell power generation apparatus through the air introduction port, and then exhausts the air to outside of the building through the air exhaust pipe.

There is also known a power generation apparatus including a duct extending vertically for improving an exhaust performance of an exhaust gas generated in a fuel cell placed inside of a building (e.g., see Patent Literature 3). In the power generation apparatus disclosed in Patent Literature 3, the duct extending vertically inside of the building and having an upper end portion located outside has a double-wall-pipe structure, and a ventilation pipe and an exhaust pipe are coupled to the duct so that the exhaust gas or air flows individually in an inner side or an outer side of the duct.

CITATION LIST

Patent Literature

Patent Literature 1: Japanese Laid-Open Patent Application Publication No.
Patent Literature 2: Japanese Laid-Open Patent Application Publication No. 2006-73446
Patent Literature 3: Japanese Laid-Open Patent Application Publication No. 2008-210631

SUMMARY INVENTION

Technical Problem

Assuming that the cogeneration system disclosed in Patent Literature 1 is placed inside of the building, a configuration described below may be possibly provided, with reference to the power generation apparatus disclosed in Patent Literature 2 or Patent Literature 3. Specifically, a cogeneration unit including a ventilation fan, a fuel cell, and a hydrogen generator for supplying a fuel gas to the fuel cell, and a hot water supply unit including a hot water supply device are placed separately, and an exhaust passage which provides communication between the cogeneration unit and the hot water supply device is provided.

In such a configuration, for example, in a case where the hot water supply device is activated and the ventilation fan is not activated, the exhaust gas exhausted from the hot water supply device may flow into the cogeneration unit through the exhaust passage. To prevent the exhaust gas exhausted from the hot water supply device from flowing back into the cogeneration unit, a back-flow preventing device (back-flow preventing valve) may be placed in the exhaust passage. The back-flow preventing valve is configured in such a manner that a valve element contacts a valve seat to prevent back flow of a gas or liquid, although there are many kinds of back-flow preventing valves.

The exhaust gas exhausted from the hot water supply device is a gas generated by combusting fuel, and therefore contains a plenty of steam. Because of this, if water droplets generated by condensation of a moisture in the exhaust gas in the hot water supply device stay inside of the back-flow preventing device and adhere to a surface of the valve element or a surface of the valve seat, this may lead to a situation in which the valve element remains incapable of moving away from the valve seat, due to a surface tension.

Especially, during a shut-down state of the cogeneration system, if the condensed water stays inside of the back-flow preventing device, the valve element remains incapable of moving away from the valve seat inside of the back-flow preventing device, so that the gas which should be exhausted is not exhausted. This may result in a situation in which ventilation of an interior of the cogeneration system cannot be sufficiently performed at start-up of the cogeneration system. If the ventilation of the interior of the cogeneration system cannot be carried out sufficiently, the gas such as a combustion exhaust gas generated inside of the cogeneration system is supplied to a cathode of the fuel cell, which decreases a power generation efficiency of the fuel cell.

An object of the present invention is to provide a power generation system having a higher durability and an operation method thereof, which are capable of carrying out power generation stably, in a case where an exhaust passage which provides communication between a fuel cell system and a combustion device is provided, and a back-flow preventing device for preventing a back flow of an exhaust gas exhausted from a combustor from flowing back to an inside of a casing of the fuel cell system is placed in the exhaust passage as described above.

Solution to Problem

To solve the problems associated with the prior arts, a power generation system of the present invention comprises a fuel cell system including a fuel cell for generating electric power using a fuel gas and an oxidizing gas and a casing accommodating the fuel cell, a gas supply device, and a controller; the power generation system further comprising: a combustion device; an exhaust passage placed to provide communication between the casing and an exhaust port of the combustion device and configured to exhaust an exhaust gas exhausted from the fuel cell system and an exhaust gas exhausted from the combustion device, to atmosphere, through an opening leading to the atmosphere; a gas passage which is provided with the gas supply device and used to supply a gas supplied from the gas supply device to the exhaust passage; and a back-flow preventing device placed in the gas passage or the exhaust passage and including a valve seat and a valve element; wherein the back-flow preventing device is configured such that the valve element moves away from the valve seat to permit the gas to flow in a direction from the casing to the opening of the exhaust passage, and the valve element contacts the valve seat to inhibit the gas from flowing in a direction from the opening of the exhaust passage to the casing and as a result to prevent the exhaust gas exhausted from the combustion device from flowing into the casing; and wherein during a shut-down state or at start-up of the fuel cell system, the controller executes an operation for relieving a state in which the valve element remains incapable of moving away from the valve seat in such a manner that the gas supply device is operated so that a differential pressure between an upstream side and a downstream side of the back-flow preventing device reaches a value which is equal to or greater than a predetermined value which can relieve the state in which the valve element remains incapable of moving away from the valve seat in the back-flow preventing device.

The term "during a shut-down state of the fuel cell system" is defined as a state before a start-up operation of the fuel cell starts after a shut-down operation of the fuel cell is finished. Therefore, "during a shut-down state of the fuel cell system" includes a power generation standby state in which a part of auxiliary devices in the fuel cell system are operated and the fuel cell system is in a standby state.

The term "at start-up of the fuel cell system" refers to a state in which the fuel cell system starts a start-up operation. Specifically, this may be a time when a signal is input to the controller to command the fuel cell system to start the start-up operation, or may be a time when the controller outputs a signal to components in the fuel cell system to command the fuel cell system to start the start-up operation. In other words, the term "at start-up of the fuel cell system" refers to a period that passes from when the signal for commanding the fuel cell system to start the start-up operation is input to the controller until the components in the fuel cell system start to be activated.

In this configuration, even in a case where the combustion device is activated, and water droplets generated by condensation of a moisture in the exhaust gas from the combustion device stay in the back-flow preventing device and cause the valve element to remain incapable of moving away from the valve seat in the back-flow preventing device, the gas supply device is operated so that the differential pressure reaches a value which is equal to or greater than the predetermined value which can relieve the state in which the valve element remains incapable of moving away from the valve seat in the back-flow preventing device, and thus the state in which the valve element remains incapable of moving away from the valve seat in the back-flow preventing device can be relieved forcibly. Therefore, reduction of an oxygen concentration in the interior of the casing can be suppressed, and hence the power generation in the fuel cell can be carried out stably.

A method of operating a power generation system of the present invention, comprises a power generation system comprising a fuel cell system including a fuel cell for generating electric power using a fuel gas and an oxidizing gas and a casing accommodating the fuel cell, a gas supply device, and a controller; the power generation system further comprising: a combustion device; an exhaust passage placed to provide communication between the casing and an exhaust port of the combustion device and configured to exhaust an exhaust gas exhausted from the fuel cell system and an exhaust gas exhausted from the combustion device, to atmosphere, through an opening leading to the atmosphere; a gas passage which is provided with the gas supply device and used to supply a gas supplied from the gas supply device to the exhaust passage; and a back-flow preventing device placed in the gas passage or the exhaust passage and including a valve seat and a valve element; wherein the back-flow preventing device is configured such that the valve element moves away from the valve seat to permit the gas to flow in a direction from the casing to the opening of the exhaust passage, and the valve element contacts the valve seat to inhibit the gas from flowing in a direction from the opening of the exhaust passage to the casing and as a result to prevent the exhaust gas exhausted from the combustion device from flowing into the casing; and wherein during a shut-down state or at start-up of the fuel cell system, the gas supply device is operated so that a differential pressure between an upstream side and a downstream side of the back-flow preventing device reaches a value which is equal to or greater than a predetermined value which can relieve a state in which the valve element remains incapable of moving away from the valve seat in the back-flow preventing device.

In this method, even in a case where the combustion device is activated, and water droplets generated by condensation of a moisture in the exhaust gas from the combustion device stay in the back-flow preventing device and cause the valve element to remain incapable of moving away from the valve seat in the back-flow preventing device, the gas supply device is operated so that the differential pressure reaches a value which is equal to or greater than the predetermined value which can relieve the state in which the valve element remains incapable of moving away from the valve seat in the back-flow preventing device, and thus the state in which the valve element remains incapable of moving away from the valve seat in the back-flow preventing device can be relieved forcibly. Therefore, reduction of an oxygen concentration in the interior of the casing can be suppressed, and hence the power generation in the fuel cell can be carried out stably.

Advantageous Effects of the Invention

In accordance with a power generation system and an operation method thereof of the present invention, even in a case where the combustion device is activated, and water droplets generated by condensation of a moisture in the exhaust gas from the combustion device stay in the back-flow preventing device and cause the valve element to remain incapable of moving away from the valve seat in the back-flow preventing device, the gas supply device is operated so that the differential pressure reaches a value which is equal to or greater than the predetermined value which can relieve the state in which the valve element remains incapable of moving away from the valve seat in the back-flow preventing device, and thus the state in which the valve element remains incapable of moving away from the valve seat in the back-flow preventing device can be relieved forcibly. Therefore, reduction of an oxygen concentration in the interior of the casing can be suppressed, and hence the power generation in the fuel cell can be carried out stably.

DESCRIPTION OF THE EMBODIMENTS

Figure 1:
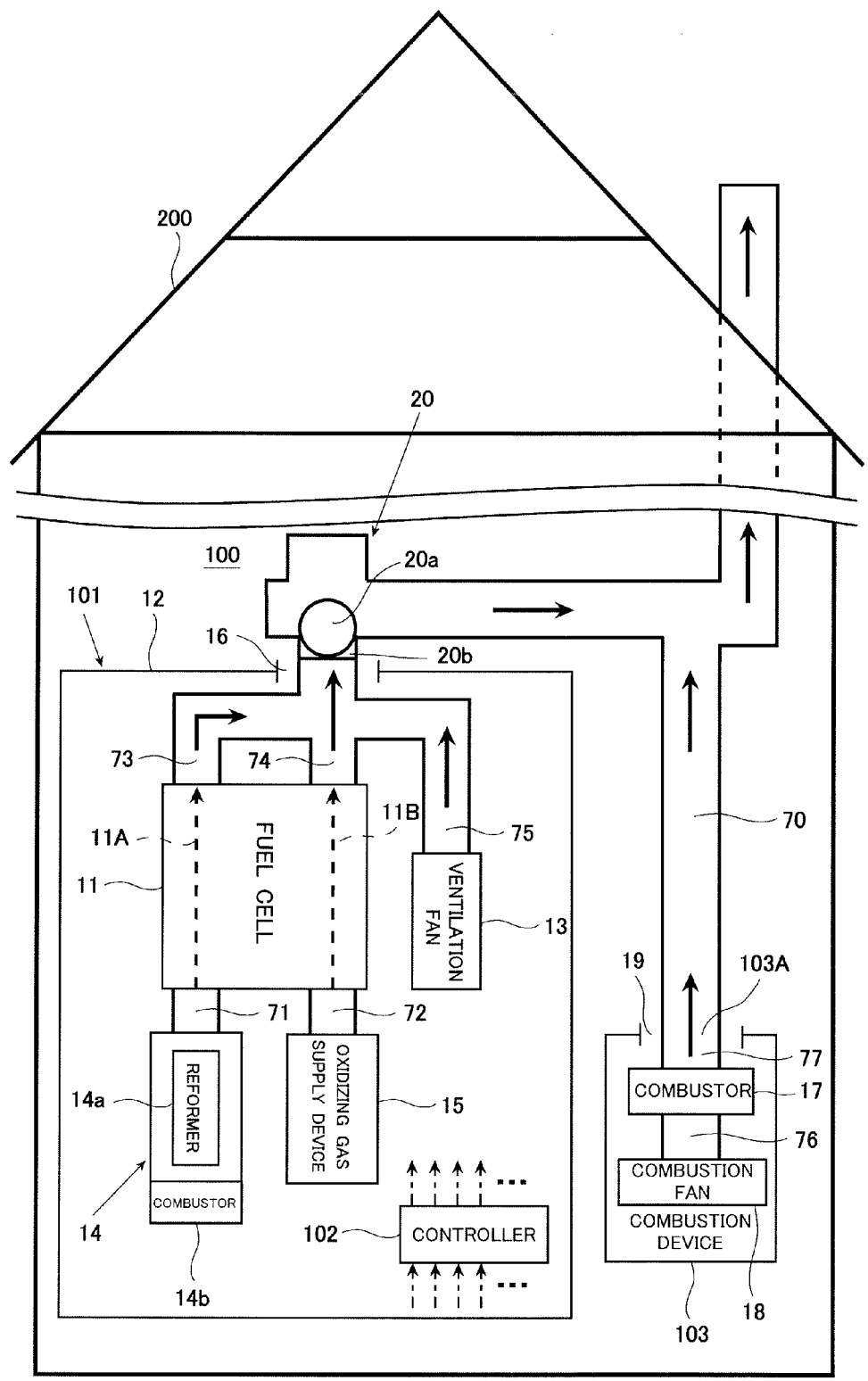
FIG. 1 is a schematic view showing a configuration of a power generation system according to Embodiment 1.

Hereinafter, preferred embodiments of the present invention will be described with reference to the drawings. Throughout the drawings, the same or corresponding components are designated by the same reference symbols, and will not be described in repetition. Throughout the drawings, only constituents required to explain the present invention are depicted, and other constituents are not depicted. Moreover, the present invention is not limited by the embodiments described below.

Embodiment 1

A power generation system according to Embodiment 1 of the present invention comprises a fuel cell system including a fuel cell for generating electric power using a fuel gas and an oxidizing gas and a casing accommodating the fuel cell, a gas supply device, and a controller; the power generation system further comprising: a combustion device; an exhaust passage placed to provide communication between the casing and an exhaust port of the combustion device and configured to exhaust an exhaust gas exhausted from the fuel cell system and an exhaust gas exhausted from the combustion device, to atmosphere, through an opening leading to the atmosphere; a gas passage which is provided with the gas supply device and used to supply a gas supplied from the gas supply device to the exhaust passage (communicating with the exhaust passage); and a back-flow preventing device placed in the gas passage or the exhaust passage and including a valve seat and a valve element; wherein the back-flow preventing device is configured such that the valve element moves away from the valve seat to permit the gas to flow in a direction from the casing to the opening of the exhaust passage, and the valve element contacts the valve seat to inhibit the gas from flowing in a direction from the opening of the exhaust passage to the casing and as a result to prevent the exhaust gas exhausted from the combustion device from flowing into the casing; and wherein during a shut-down state or at start-up of the fuel cell system, the controller executes an operation for relieving a state in which the valve element remains incapable of moving away from the valve seat in such a manner that the gas supply device is operated so that a differential pressure between an upstream side and a downstream side of the back-flow preventing device reaches a value which is equal to or greater than a predetermined value which can relieve the state in which the valve element remains incapable of moving away from the valve seat in the back-flow preventing device.

The term "during a shut-down state of the fuel cell system" is defined as a state before a start-up operation of the fuel cell starts after a shut-down operation of the fuel cell is finished. Therefore, "during a shut-down state of the fuel cell system" includes a power generation standby state in which a part of auxiliary devices in the fuel cell system are operated and the fuel cell system is in a standby state.

The term "at start-up of the fuel cell system" refers to a state in which the fuel cell system starts a start-up operation. Specifically, this may be a time when a signal is input to the controller to command the fuel cell system to start the start-up operation, or may be a time when the controller outputs a signal to components in the fuel cell system to command the fuel cell system to start the start-up operation. In other words, the term "at start-up of the fuel cell system" refers to a period that passes from when the signal for commanding the fuel cell system to start the start-up operation is input to the controller until the components in the fuel cell system start to be activated.

[Configuration of Power Generation System]

FIG. 1 is a schematic view showing a configuration of a power generation system according to Embodiment 1.

As shown in FIG. 1, a power generation system 100 according to Embodiment 1 is placed inside of a building 200. The power generation system 100 includes a fuel cell 11, a casing 12, a reformer 14a, and a combustor 14b, a ventilation fan (ventilator) 13, a controller 102, a combustion device 103, an exhaust passage 70, and a back-flow preventing device 20. The exhaust passage 70 is placed to provide communication between the casing 12 of the fuel cell system 101 and an exhaust port 103A of the combustion device 103.

The controller 102 executes an operation for relieving a state in which a valve element remains incapable of moving away from a valve seat in the back-flow preventing device 20 by operating a gas supply device so that a differential pressure between an upstream side and a downstream side of the back-flow preventing device 20 reaches a value which is equal to or greater than a predetermined value which can relieve the state in which the valve element remains incapable of moving away from the valve seat in the back-flow preventing device 20.

The gas supply device may be any device so long as it can supply the gas within the fuel cell system 101. In Embodiment 1, as the gas supply device, the ventilation fan 13 and an oxidizing gas supply device 15 are exemplarily provided. The gas passage is defined as a passage through which a gas supplied from the gas supply device flows. In Embodiment 1, as the gas passage, an oxidizing gas supply passage 72, an off-oxidizing-gas supply passage 74, and a ventilation passage 7, are exemplarily provided.

Although in Embodiment 1, the power generation system 100 is placed inside of the building 200, the present invention is not limited to this. The power generation system 100 may be placed outside of the building 200 so long as the exhaust passage 70 is placed to provide communication between the casing 12 of the fuel cell system 101 and the exhaust port 103A of the combustion device 103.

Inside of the casing 12 of the fuel cell system 101, the fuel cell 11, the ventilation fan 13, a fuel gas supply device 14 and the oxidizing gas supply device 15 are placed. In addition, the controller 102 is placed inside of the casing 12. Although in Embodiment 1, the controller 102 is placed inside of the casing 12 of the fuel cell system 101, the present invention is not limited to this. The controller 102 may be placed inside of the combustion device 103, or placed separately from the casing 12 and the combustion device 103.

A hole 16 is provided in a suitable location of a wall defining the casing 12 to penetrate the wall in a thickness direction. A pipe defining the exhaust passage 70 is inserted into the hole 16 such that there is a gap between the pipe and the hole 16. The gap between the hole 16 and the exhaust passage 70 define a intake port 16. Through the intake port 16, air outside of the power generation system 100 can be supplied to inside of the casing 12.

Although in Embodiment 1, the hole into which the pipe defining the exhaust passage 70 is inserted and the hole defining the intake port 16 are constructed as the single hole 16, the present invention is not limited to this. The hole into which the pipe defining the exhaust passage 70 is inserted and the hole defining the intake port 16 may be provided separately on the casing 12. The intake port 16 may be defined by one hole or a plurality of holes.

The fuel gas supply device 14 may be configured to supply the fuel gas (hydrogen gas) to the fuel cell 11 while adjusting a flow rate of the fuel gas. As the fuel gas supply device 14, a hydrogen generator including the reformer 14a for generating the fuel gas from a hydrocarbon gas which is a raw material and steam, and the combustor 14b configured to heat the reformer 14a, is used. The combustor 14a is constituted by a burner, a combustion catalyst, etc.

In Embodiment 1, the fuel cell 11 (to be precise, entrance of the fuel gas passage 11A of the fuel cell 11) is connected to the fuel gas supply device 14, via a fuel gas supply passage 71.

The oxidizing gas supply device 15 may have any configuration so long as it is able to supply an oxidizing gas (air) to the fuel 11 while adjusting its flow rate, and may be constituted by a fan component such as a fan or a blower. The fuel cell 11 (*to* be precise, entrance of an oxidizing gas passage 11B of the fuel cell 11) is connected to the oxidizing gas supply device 15 via the oxidizing gas supply passage 72.

The fuel cell 11 has an anode (not shown) and a cathode (not shown). In the fuel cell 11, the fuel gas supplied to the fuel gas passage 11A is supplied to the anode while flowing through the fuel gas supply passage 11A. Also, in the fuel cell 11, the oxidizing gas supplied to the oxidizing gas passage 11B is supplied to the cathode while flowing through the oxidizing gas passage 11B. The fuel gas supplied to the anode and the oxidizing gas supplied to the cathode are reacted with each other, thereby generating electricity and heat.

The generated electricity is supplied to an outside power load (e.g., home electric devices) by a power conditioner (not shown). The generated heat is recovered by a heat medium flowing through a heat medium passage (not shown). The heat recovered by the heat medium can be used to heat water, for example.

In Embodiment 1, as the fuel cell 11, various fuel cells may be used, examples of which are a polymer electrolyte fuel cell, a direct internal reforming solid oxide fuel cell, and an indirect internal reforming solid oxide fuel cell. Although in Embodiment 1, the fuel cell 11 and the fuel gas supply device 14 are separately provided, the present invention is not limited to this, but the fuel gas supply device 14 and the fuel cell 11 may have a unitary construction, like a solid oxide fuel cell. In this case, the fuel cell 11 and the fuel gas supply device 14 are constructed as one unit which is covered with a common heat insulating member, and the combustor 14b is able to heat the fuel cell 11 in addition to the reformer 14a. In the direct internal reforming solid oxide fuel cell, the anode of the fuel cell 11 has a function of the reformer 14a. Therefore, the anode of the fuel cell 11 and the reformer 14a may have a unitary construction. Since a configuration of the fuel cell 11 is the same as that of a general fuel cell, it will not be described in detail.

An upstream end of the off-fuel-gas passage 73 is connected to an exit of the fuel gas passage 11A. A downstream end of the off-fuel-gas passage 73 is connected to the exhaust passage 70. An upstream end of the off-oxidizing-gas passage 74 is connected to an exit of the oxidizing gas passage 11B. A downstream end of the off-oxidizing-gas passage 74 is connected to the exhaust passage 70.

Thereby, the fuel gas (hereinafter referred to as off-fuel-gas) which has not been consumed in the fuel cell 11 is exhausted from the exit of the fuel gas passage 11A to the exhaust passage 70 via the off-fuel-gas passage 73. Also, the oxidizing gas (hereinafter referred to as off-oxidizing-gas) which has not been consumed in the fuel cell 11 is exhausted from an exit of the oxidizing gas passage 11B to the exhaust passage 70 via the off-oxidizing-gas passage 74. The off-fuel-gas exhausted to the exhaust passage 70 is diluted by the off-oxidizing-gas and exhausted to outside of the building 200.

The ventilation fan 13 is connected to the exhaust passage 70 via a ventilation passage 75. The ventilation fan 13 may have any configuration so long as it is capable of ventilating the interior of the casing 12. With this configuration, air outside of the power generation system 100 is supplied to inside of the casing 12 through the intake port 16, and the ventilation fan 13 is activated, so that the gas (mainly, air) is exhausted from inside of the casing 12 to outside of the building 200 via the ventilation passage 75 and the exhaust passage 70. In this way, the interior of the casing 12 is ventilated.

Although in Embodiment 1, the fan is used as the ventilation device, the present invention is not limited to this, and the blower may be used as the ventilation device. Although the ventilation fan 13 is placed inside of the casing 12, the present invention is not limited to this. The ventilation fan 13 may be placed inside of the exhaust passage 70. In this case, the ventilation fan 13 is preferably positioned upstream of a branch portion of the exhaust passage 70.

The combustion device 103 includes the combustor 17 and a combustion fan (combustion air supply device) 18. The combustor 17 and the combustion fan 18 may be connected together via a combustion air supply passage 76. The combustion fan 18 may have any configuration so long as it is able to supply combustion air to the combustor 17, and may be, for example, a fan component such as a fan or a blower.

The combustor 17 is supplied with combustion fuel such as a combustible gas such as a natural gas or liquid fuel such as kerosene, from a combustion fuel supply device which is not shown. The combustor 17 combusts the combustion air supplied from the combustion fan 18 and the combustion fuel supplied from the combustion fuel supply device to generate heat and combustion exhaust gas. The generated heat may be used to heat the water. That is, the combustion device 103 may be used as a boiler.

An upstream end of the exhaust gas passage 77 is connected to the combustor 17, while a downstream end of the exhaust gas passage 77 is connected to the exhaust passage 70. Thus, the combustion exhaust gas generated in the combustor 17 is exhausted to the exhaust passage 70 via the exhaust gas passage 77. That is, the combustion exhaust gas generated in the combustor 17 is exhausted to the exhaust passage 70 as the exhaust gas exhausted from the combustion device 103. Then, the combustion exhaust gas exhausted to the exhaust passage 70 is exhausted to outside of the building 200 through the exhaust passage 70.

A hole 19 is provided in a suitable location of a wall defining the combustion device 103 to penetrate the wall in a thickness direction. A pipe defining the exhaust passage 70 is inserted into the hole 19 such that there is a gap between the pipe and the hole 19. The gap between the hole 19 and the exhaust passage 70 define the intake port 19. Through the intake port 19, air outside of the power generation system 100 can be supplied to inside of the combustion device 103.

That is, the exhaust passage 70 branches, and two upstream ends are connected to the hole 16 and the hole 19, respectively. The exhaust passage 70 may extend to outside of the building 20, and its downstream end (opening) opens to atmosphere. This allows the casing 12 and the exhaust port 103A of the combustion device 103 to communicate with each other via the exhaust passage 70.

Although in Embodiment 1, the hole into which the pipe defining the exhaust passage 70 is inserted and the hole defining the intake port 19 are constructed as the single hole 19, the present invention is not limited to this. The hole into which the pipe defining the exhaust passage 70 is inserted (connected) and the hole defining the intake port 19 may be separately provided in the combustion device 103. The intake port 19 may be defined by one hole or a plurality of holes in the combustion device 103.

The back-flow preventing device 20 is provided in a location between the upstream end of the exhaust passage 70 at the hole 16 side and a branch point of the exhaust passage 70. In the present embodiment, the back-flow preventing device 20 is constituted by a ball-type check valve, and includes a ball (valve element) 20a and a valve seat 20b. Although the back-flow preventing device 20 is the ball-type check valve, the present invention is not limited to this. The back-flow preventing device 20 may be any of check valves such as a lift-type check valve, a swing-type check valve, and a diaphragm-type check valve. For example, as the valve element 20a, a plate-shaped flap may be used instead of the ball. Although in Embodiment 1, the back-flow preventing device 20 is provided in the exhaust passage 70, the present invention is not limited to this. For example, the back-flow preventing device 20 may be provided in the gas passage.

In the above configuration, when the exhaust gas exhausted from the combustion device 103 flows through the exhaust passage 70 back to the upstream end of the exhaust passage 70 at the hole 16 side, during the shut-down state of the fuel cell system 101, the ball 20a contacts the vale seat 20b, due to an increase in a pressure of the exhaust gas from the combustion device 103. Thus, it becomes possible to prevent the exhaust gas from the combustion device 103 from flowing back to inside of the casing 12. On the other hand, when the fuel cell system 101 and/or the ventilation fan 13 are/is activated and thereby a pressure of the exhaust gas exhausted from the fuel cell system 101 and/or the ventilation fan 13 increases, the ball 20a moves upward, thereby allowing the exhaust gas to flow through the exhaust passage 70.

The controller 102 may have any configuration so long as it is able to control the components in the power generation system 100. The controller 102 includes a processor section represented by a microprocessor, a CPU, etc., and a memory section constituted by a memory, etc., which contains programs for executing control operations. The controller 102 reads out specified control programs stored in the memory section and executes them, thus processing these information and performing control relating to the power generation system 100 including the control therefor.

The controller 102 may consist of a single controller or may be constituted by a controller group composed of a plurality of controllers that cooperate with each other to control the power generation system 100. For example, the controller 102 may be configured to control the ventilation fan 13 and another controller may be configured to control the components other than the ventilation fan 13 in the power generation system 100. The controller 102 may be constituted by a microcontroller, MPU, PLC (programmable logic controller), a logic circuit, etc.

[Operation of Power Generation System]

Next, the operation of the power generation system 100 according to Embodiment 1 will be described with reference to FIGS. 1 and 2. Since a power generation operation of the fuel cell system 101 in the power generation system 100 is similar to a power generation operation of a general fuel cell system, its detailed description will not be given. In Embodiment 1, it is supposed that the controller 102 consists of a single controller and controls the components in the power generation system 100.

[Start-Up Operation of Fuel Cell System]

Figure 2:
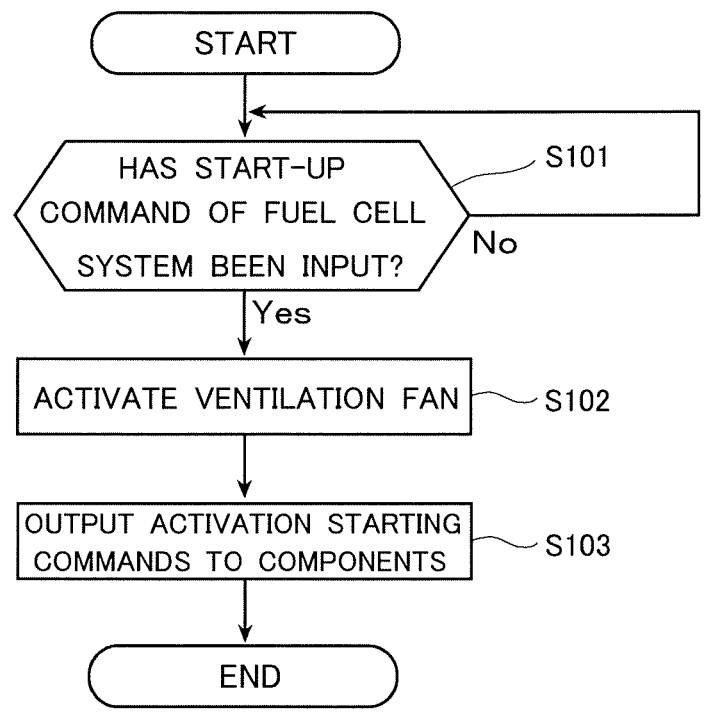
FIG. 2 is a flowchart schematically showing a start-up operation of a fuel cell system in the power generation system according to Embodiment 1.

FIG. 2 is a flowchart schematically showing a start-up operation of the fuel cell system in the power generation system according to Embodiment 1.

As described above, the combustion exhaust gas exhausted from the combustion device 103 contains the steam. If the ball 20a and/or the valve seat 20b in the back-flow preventing device 20 contact each other in a state in which the condensed water generated by condensation of the steam adheres to the surface of the ball 20a and/or the surface of the valve seat 20b, the ball 20a remains incapable of moving away from the valve seat 20b, so that the gas cannot be exhausted from inside of the casing 12 to the exhaust passage 70. To avoid this, the power generation system 100 of Embodiment 1 carries out the start-up operation as described below.

At start-up of the fuel cell system 101, an operation for relieving the state in which the ball 20a remains incapable of moving away from the valve seat 20b is carried out in a state in which the gas supply device is deactivated and the exhaust gas is not exhausted from the fuel cell system 101 to the exhaust passage 70 during a shut-down state (including a standby state) of the fuel cell system 101.

As shown in FIG. 2, the controller 102 checks whether or not a start-up command of the fuel cell system 101 has been input (step S101). As an example of a case where the start-up command of the fuel cell system 101 is input, there are a case where a user of the power generation system 100 manipulates a remote controller (not shown) to command the fuel cell system 101 to be activated, a case where the time gets to a preset operation start time of the fuel cell system 101, etc.

In step S102, the controller 102 activates the ventilation fan 13 (executes the operation for relieving the state in which the ball 20a remains incapable of moving away from the valve seat 20b). Specifically, the ventilation fan 13 is activated so that the differential pressure between the upstream side and the downstream side of the back-flow preventing device 20 reaches a value which is equal to or greater than a predetermined value which can relieve the state in which the ball 20a remains incapable of moving away from the valve seat 20b in the back-flow preventing device 20. The predetermined value can be found in advance from an experiment, etc., and the static pressure of the ventilation fan 13 may be greater than a value of the pressure in the ventilation fan 13 during a steady operation of the fuel cell system 101.

The differential pressure between the upstream side and the downstream side of the back-flow preventing device 20 is defined as a difference between a pressure in a portion of the exhaust passage 70 which is located upstream of the back-flow preventing device 20 and a pressure in a portion of the exhaust passage 70 which is located downstream of the back-flow preventing device 20.

An operation time of the ventilation fan 13 may be set as desired. For example, the ventilation fan 13 may be activated for several seconds, several tens seconds, or several minutes.

In the above described manner, the ball 20a can be moved upward more surely, and the interior of the casing 12 can be ventilated more surely.

Next, the controller 102 outputs activation starting commands to the components in the fuel cell system 101 (step S104), and finishes the present flow. Thereupon, the start-up operation of the fuel cell system 101 is started. To be specific, the combustor 14a and/or the oxidizing gas supply device 15 are/is activated.

To be in a greater detail, the combustion fuel (e.g., natural gas) and the combustion air are supplied to the combustor 14a of the fuel gas supply device 14. The combustor 14a combusts the combustion fuel and the combustion air to generate the combustion exhaust gas. The reformer 14a is heated by heat transferred from the generated combustion exhaust gas.

At a time point when a temperature of the reformer 14a has reached a temperature at which the raw material (e.g., hydrocarbon such as methane) can be reformed, the raw material and the steam are supplied to the reformer 14a. The reformer 14a generates the fuel gas through a reforming reaction between the raw material and the steam. The generated fuel gas is supplied to the fuel cell 11 (to be precise, fuel gas passage 11A) via the fuel gas supply passage 71. The oxidizing gas supply device 15 supplies the oxidizing gas to the fuel cell 11 (to be precise, oxidizing gas passage 11B) via the oxidizing gas supply passage 72.

In Embodiment 1, the ventilation fan 13 is activated, to execute the operation for relieving the state in which the ball 20a remains incapable of moving away from the valve seat 20b, then the combustor 14a is activated, and then the oxidizing gas supply device 15 is activated. However, the present invention is not limited to this, and the following configuration may be performed. After the ventilation fan 13 is activated, the oxidizing gas supply device 15 is activated, and then the combustor 14a is activated. Or, after the ventilation fan 13 is activated, the combustor 14a and the oxidizing gas supply device 15 are activated.

As described above, in the power generation system 100 of Embodiment 1, when the combustion device 103 is activated and thereby the state in which the valve element remains in contact with the valve seat in the back-flow preventing device 20 is maintained, the ventilation fan 13 is activated so that the differential pressure between the upstream side and the downstream side of the back-flow preventing device 20 reaches a value which is equal to or greater than the predetermined value which can relieve the state in which the valve element remains incapable of moving away from the valve seat in the back-flow preventing device 20, at start-up of the fuel cell system 101.

Thus, the ball 20a is caused to move upward, so that the exhaust gas from the fuel cell system 101 and the ventilation fan 13 flows through the exhaust passage 70 and is exhausted to outside of the power generation system 100.

[Operation During Shut-Down State of Fuel Cell System]

Next, an operation performed during the shut-down state of the fuel cell system 101 in the power generation system 100 according to Embodiment 1 will be described.

Initially, the controller 102 checks whether or not the fuel cell system 101 is during the shut-down state. To be specific, the controller 102 can determine whether or not the fuel cell system 101 is during the shut-down state depending on, for example, whether or not a shut-down command output to the fuel cell system 101 is stored in a memory section (not shown). Note that in Embodiment 1, whether or not the combustion device 103 continues to be activated during the shut-down state of fuel cell system 101 is not problematic.

During the power generation operation of the fuel cell system 101, the ventilation fan 13 has already been activated, and the exhaust gas from the fuel cell system 101 or the gas (mainly, air) from inside of the casing 12 has been exhausted to the exhaust passage 70. Therefore, the controller 102 need not newly activate the ventilation fan 13, and therefore finishes the control program.

As described above, during the shut-down state of the fuel cell system 101, the combustion exhaust gas exhausted from the combustion device 103 contains the steam. And, therefore, if the ball 20a and the valve seat 20b contact each other in the state in which the condensed water generated by condensation of the steam adheres to the surface of the ball 20a and/or the surface of the valve seat 20b, the ball 20a remains incapable of moving away from the valve seat 20b, so that the gas cannot be exhausted from inside of the casing 12 to the exhaust passage 70.

To avoid this, the controller 102 activates the ventilation fan 13 (executes the operation for relieving the state in which the ball 20a remains incapable of moving away from the valve seat 20b). To be specific, the controller 102 activates the ventilation fan 13 so that the differential pressure between the upstream side and the downstream side of the back-flow preventing device 20 reaches the value which is equal to or greater than the predetermined value which can relieve the state in which the ball 20a remains incapable of moving away from the valve seat 20b in the back-flow preventing device 20. The operation time of the ventilation fan 13 may be set as desired. For example, the ventilation fan 13 may be activated for several seconds, several tens seconds, or several minutes.

Thus, even when the valve element contacts the valve seat in the back-flow preventing device 20 during the shut-down state of the fuel cell system 101, the ball 20a is moved upward and the state in which the ball 20a remains incapable of moving away from the valve seat 20b can be relieved, by activating the ventilation fan 13. Because of this, when the fuel cell system 101 is started-up, the exhaust gas from the fuel cell system 101 and the exhaust gas from the ventilation fan 13 are flowed through the exhaust passage 70 and exhausted to outside of the power generation system 100.

Because of the above, in the power generation system 100 of Embodiment 1, since the interior of the casing 12 is ventilated, reduction of an oxygen concentration in the interior of the casing 12 can be suppressed, an ignition failure in the combustor 14a can be suppressed, and reliability of the power generation system 100 can be improved.

Although in Embodiment 1, the exhaust passage 70, the off-fuel-gas passage 73, the off-oxidizing-gas passage 74 and the exhaust gas passage 77 are different passages, the present invention is not limited to this. These passages may be collectively interpreted as the exhaust passage 70.

Although in Embodiment 1, the controller 102 continues to activate the ventilation fan 13 for the predetermined time, the present invention is not limited to this. For example, the controller 102 may be configured to activate the ventilation fan 13 intermittently.

Embodiment 2

In a power generation system according to Embodiment 2, the controller controls the gas supply device so that an output pressure of the gas supply device becomes greater when the operation for relieving the state in which the valve element remains incapable of moving away from the valve seat is executed during an activated state of the combustion device than when the operation for relieving the state in which the valve element remains incapable of moving away from the valve seat is executed during a deactivated state of the combustion device.

The power generation system according to Embodiment 2 may further include an operation detector for detecting the activated state and the deactivated state of the combustion device, and the controller may control the gas supply device to execute the operation for relieving the state in which the valve element remains incapable of moving away from the valve seat, when the operation detector detects the activated state of the combustion device, during the shut-down state of the fuel cell system.

[Configuration of Power Generation System]

Figure 3:
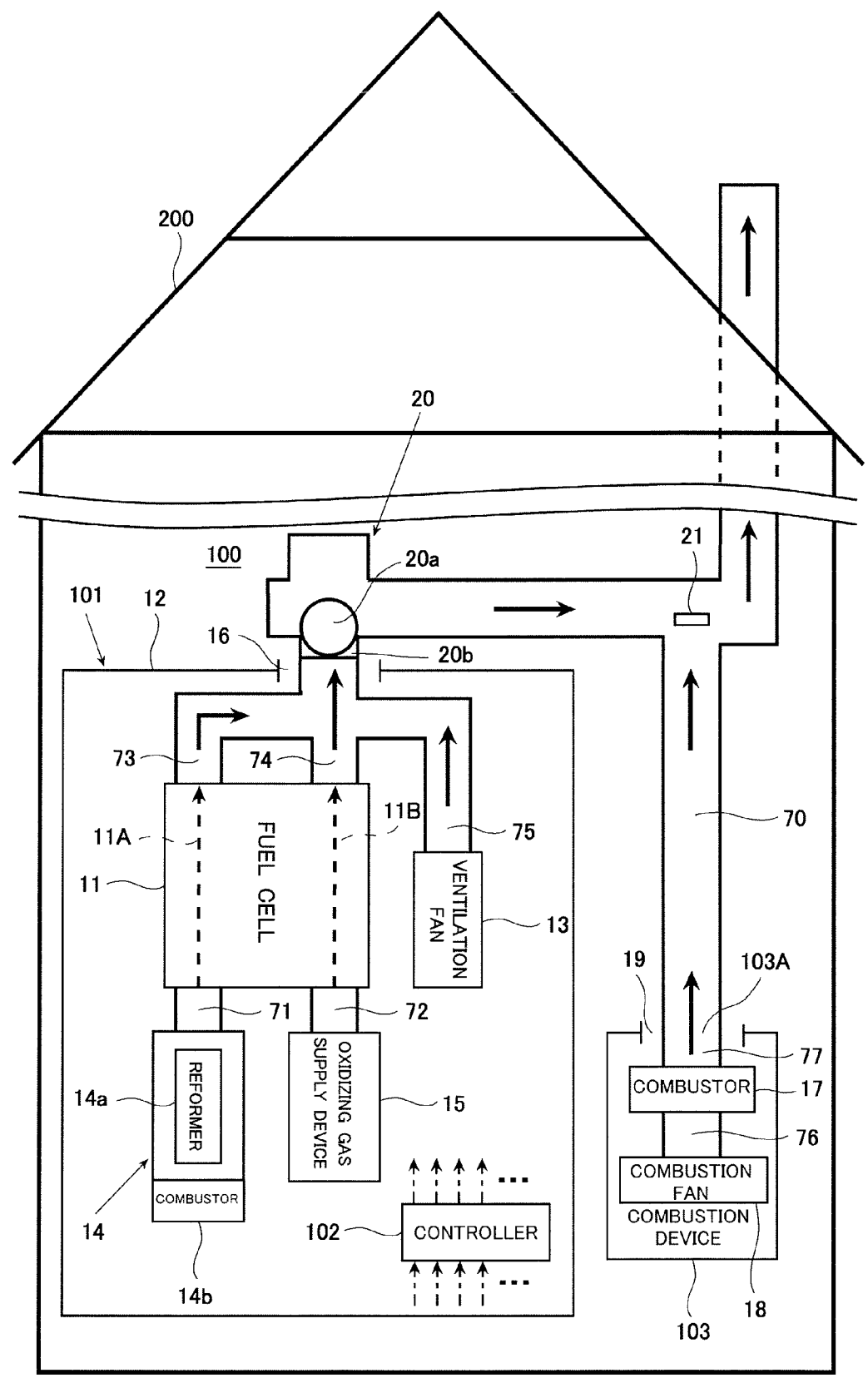
FIG. 3 is a schematic view showing a configuration of a power generation system according to Embodiment 2.

FIG. 3 is a schematic view showing a configuration of the power generation system according to Embodiment 2.

As shown in FIG. 3, a power generation system 100 according to Embodiment 2 has basically the same configuration as that of the power generation system 100 according to Embodiment 1, except that a temperature detector (operation detector) 21 is attached on the exhaust passage 70. The temperature detector 21 detects the temperature in the exhaust passage 70 and outputs the detected temperature to the controller 102. As the temperature detector 21, a temperature sensor such as a thermocouple may be used.

Although in Embodiment 2, the temperature detector 21 is attached on the exhaust passage 70, the present invention is not limited to this. The temperature detector 21 may be attached on at least one of the exhaust passage 70, the off-fuel-gas passage 73, the off-oxidizing-gas passage 74 and the ventilation passage 75.

[Operation of Power Generation System]

Figure 4:
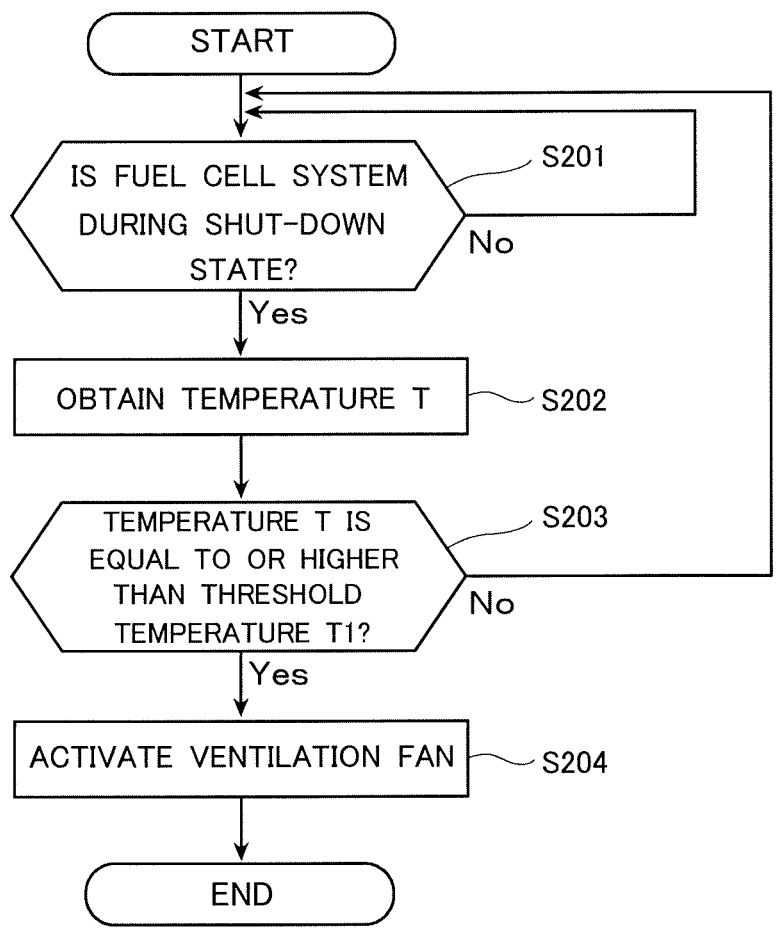
FIG. 4 is a flowchart schematically showing an operation for relieving a state in which a valve element remains incapable of moving away from a valve seat in the power generation system according to Embodiment 2.

FIG. 4 is a flowchart schematically showing the operation for relieving the state in which the valve element remains incapable of moving away from the valve seat, in a power generation system according to Embodiment 2.

As shown in FIG. 4, the controller 102 determines whether or not the fuel cell system 101 is during the shut-down state (step S201). To be specific, the controller 102 can determine whether or not the fuel cell system 101 is during the shut-down state depending on whether or not a shut-down command output to the fuel cell system 101 is stored in the memory section (not shown).

If it is determined that the fuel cell system 101 is not during the shut-down state (No in step S201), step S201 is repeated until it is determined that the fuel cell system 101 is during the shut-down state. On the other hand, if it is determined that the fuel cell system 101 is during the shut-down state (Yes in step S201), the process goes to step S202.

In step S202, the controller 202 obtains a temperature T detected by the temperature detector 21 from the temperature detector 21. Then, the controller 102 determines whether or not the temperature T obtained in step S202 is equal to or higher than a preset threshold temperature T1 (step S203). The threshold temperature T1 may be in a temperature range in a case where the exhaust gas exhausted from the combustion device 103 flows through the exhaust passage 70, which range is found in advance by, for example, an experiment. Or, for example, a temperature which is 20 degrees C. or more higher than a temperature in the interior of the building 200 or an outside temperature may be set as the threshold temperature T1.

If it is determined that the temperature T obtained in step S202 is lower than the threshold temperature T1 (No in step S203), the process returns to step S201, and repeats steps 201 to step S203 until it is determined that the fuel cell system 101 is during the shut-down state and the temperature T obtained in step S202 becomes equal to or higher than the threshold temperature T1. On the other hand, if it is determined that the temperature T obtained in step S202 is equal to or higher than the threshold temperature T1 (Yes in step S203), the controller 102 determines that the combustion device 103 is activated (including start of operation), and the process goes to step S204.

In step S204, the controller 102 activates the ventilation fan 13 (executes the operation for relieving the state in which the valve element remains incapable of moving away from the valve seat) and finishes the present flow. To be specific, the controller 102 controls the ventilation fan 13 so that the output pressure of the ventilation fan 13 becomes greater than in the case where the operation for relieving the state in which the valve element remains incapable of moving away from the valve seat is executed during the deactivated state of the combustion device 103.

During the activated state of the combustion device 103, the pressure in a portion of the exhaust passage 70 which is located downstream of the back-flow preventing device 20 becomes higher. Because of this, it is necessary to increase the output pressure (operation amount of the ventilation fan 13) of the ventilation fan 13 so that the differential pressure between the upstream side and the downstream side of the back-flow preventing device 20 reaches a value which is equal to or greater than the predetermined value which can relieve the state in which the valve element remains incapable of moving away from the valve seat in the back-flow preventing device 20. Therefore, the controller 102 controls the ventilation fan 13 so that the output pressure of the ventilation fan 13 becomes greater than in the case where the operation for relieving the state in which the valve element remains incapable of moving away from the valve seat is executed during the deactivated state of the combustion device 103.

Thus, even when the valve element contacts the valve seat in the back-flow preventing device 20 during the shut-down state of the fuel cell system 101, the ball 20a is moved upward, and the state in which the ball 20a remains incapable of moving away from the valve seat 20b can be relieved, by activating the ventilation fan 13.

The power generation system 100 according to Embodiment 2 configured as described above can achieve the same advantages as those of the power generation system 100 according to Embodiment 1.

Although in Embodiment 2, it is determined that the combustion device 103 is during the activated state, when the temperature T detected by the temperature detector 21 is equal to or higher than the threshold temperature T1, the present invention is not limited to this. For example, the controller 102 may determine that the combustor 102 is during the activated state, when a difference between the temperature detected by the temperature detector 21 before a particular time and the temperature detected by the temperature detector 21 after the particular time is equal to or higher than a threshold temperature T2. The threshold temperature T2 may be found in advance, by, for example, an experiment, and may be, for example, 10 degrees C.

Although in Embodiment 2, the temperature detector 21 is the operation detector, the present invention is not limited to this. For example, as the operation detector, a pressure detector may be used. To be specific, the pressure sensor may be attached on at least one of the exhaust passage 70, the off-fuel-gas passage 73, the off-oxidizing-gas passage 74 and the ventilation passage 75, and it may be determined whether or not the combustion device 103 is activated based on the pressure detected by the pressure sensor.

To be more specific, the pressure sensor detects the pressure in the passage and outputs the detected pressure to the controller 102. If the input pressure is equal to or greater than a threshold pressure P1 or a differential pressure between a pressure before a particular time and a pressure after the particular time is equal to or greater than a threshold pressure P2, the controller 102 may determine that the combustion device 103 is activated. The threshold pressure P1 or the threshold pressure P2 may be found in advance, by, for example, an experiment.

For example, as the operation detector, a flow detector (gas meter) for detecting a flow rate of the combustion fuel (natural gas) supplied to the combustion device 103 may be used. To be specific, the flow detector detects the flow rate of the combustion fuel supplied to the combustion device 103, and outputs the detected flow rate to the controller 102. If the input flow rate is equal to or greater than a threshold flow rate F1 or a differential flow rate between a flow rate before a particular time and a flow rate after the particular time is equal to or greater than a threshold flow rate F2, the controller 102 determines that the combustor 102 is activated. The threshold flow rate F1 or the threshold flow rate F2 may be found in advance, by, for example, an experiment.

For example, in a case where the user provides a remote controller for commanding the combustion device 103 to be activated, the remote controller may be used as the operation detector. To be specific, if the operation command is output from the remote controller to the combustion device 103, the controller 102 may determine that the combustion device 103 is activated.

For example, in a case where the combustion device 103 is used as a boiler, a temperature sensor may be attached on a water passage through which water heated by the combustion device 103 flows, and the temperature sensor may be used as the operation detector. Specifically, if the input temperature is equal to or higher than a threshold temperature T3 or a difference between a temperature before a particular time and a temperature after the particular time is equal to or higher than a threshold temperature T4, the controller 102 may determine that heat is supplied from the combustion device 103 and hence the combustion device 103 is activated. The threshold temperature T3 or the threshold temperature T4 may be found in advance, by, for example, an experiment.

Moreover, for example, the controller 102 may determine that the combustion device 103 is activated based on whether or not the activation command output to the combustion device 103 is stored in the memory section (not shown). In this case, the controller 102 has a function of the operation detector.

Modified Example 1

Next, Modified example of the power generation system 100 according to Embodiment 2 will be described.

In the power generation system according to Modified example 1 of Embodiment 2, the controller is configured to control the gas supply device so that the operation for relieving the state in which the valve element remains incapable of moving away from the valve seat is executed again if the operation detector detects the activated state of the combustion device again in a period until the start-up of the fuel cell system starts after the operation for relieving the state in which the valve element remains incapable of moving away from the valve seat is executed during the shut-down state of the fuel cell system, whereas the controller is configured to control the gas supply device so that the operation for relieving the state in which the valve element remains incapable of moving away from the valve seat is not executed again, if the operation detector does not detect the activated state of the combustion device.

A configuration of the power generation system according to Modified example 1 is the same as the configuration of power generation system according to Embodiment 2, and will not be described in repetition.

[Operation of Power Generation System]

Figure 5:
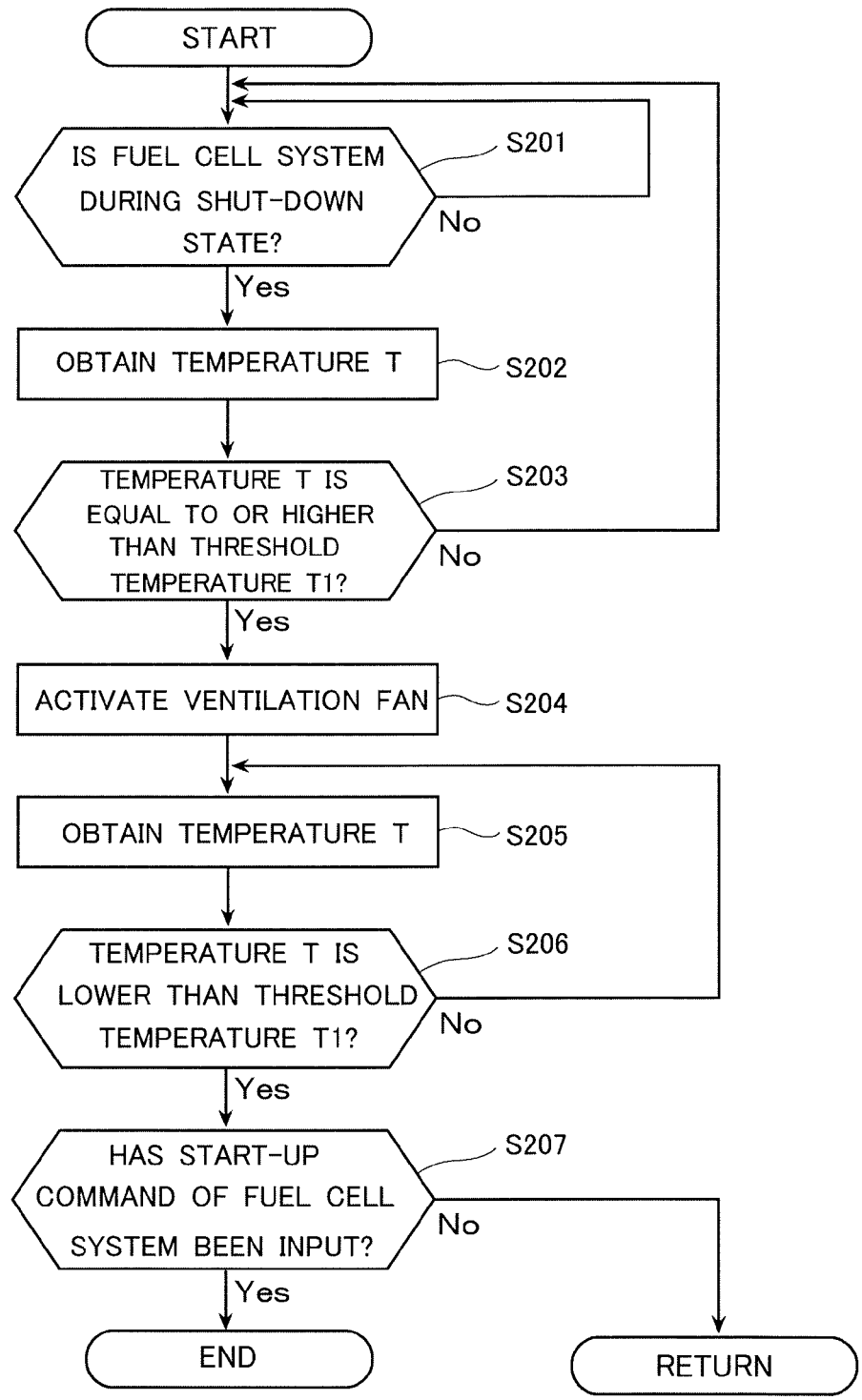
FIG. 5 is a flowchart schematically showing an operation for relieving the state in which the element remains incapable of moving away from the valve seat in a power generation system according to Modified example 1.

FIG. 5 is a flowchart schematically showing the operation for relieving the state in which the valve element remains incapable of moving away from the valve seat, in the power generation system according to Modified example 1.

As shown in FIG. 5, the operation for relieving the state in which the valve element remains incapable of moving away from the valve seat is such that step S205, step S206, and step S207 are executed after executing the steps S201 to S204 which are the operation for relieving the state in which the valve element remains incapable of moving away from the valve seat in the power generation system according to Embodiment 2, and this flow is repeated until the start-up starting command of the fuel cell system 101 is input.

As described in Embodiment 2, when the controller 102 detects the activated state of the combustion device 103 (detects the activated state of the combustion device 103), it activates the gas supply device (ventilation fan 13) to execute the operation for relieving the state in which the valve element remains incapable of moving away from the valve seat (step S204). Then, the controller 102 obtains again the temperature T detected by the temperature detector 21, from the temperature detector 21 (step S205).

Then, the controller 102 determines whether or not the temperature T obtained in step S205 is lower than the threshold temperature T1 (step S206). If it is determined that the temperature T obtained in step S205 is equal to or higher than the threshold temperature T1 (No in step S206), the controller 102 determines that the combustion device 103 is during the activated state and the process returns to step S205. Then, the controller 102 repeats the step S205 and the step S206 until the temperature T obtained in step S205 becomes lower than the threshold temperature T1.

On the other hand, if it is determined that the temperature T obtained in step S205 is lower than the threshold temperature T1 (Yes in step S206), the controller 102 determines that the combustion device 103 has stopped its operation (the combustion device 103 is deactivated), and the process goes to step S207.

In step S207, the controller 102 determines whether or not the start-up command of the fuel cell system 101 has been input. If it is determined that the start-up command of the fuel cell system 101 has not been input (No in step S207), the process returns to step S201.

On the other hand, if it is determined that the start-up command of the fuel cell system 101 has been input (Yes in step S207), the controller 102 finishes the present flow. In this case, after the present flow ends, the controller 102 executes the flow of FIG. 2.

The power generation system 100 according to Modified example 1 configured as described above can achieve the same advantages as those of the power generation system 100 according to Embodiment 2.

Embodiment 3

A power generation system according to Embodiment 3 includes an air supply passage placed to provide communication between the casing and the combustion device and supplies the air from outside to the fuel cell system and to the combustion device, and the air supply passage is configured to exchange heat with the exhaust passage.

The phrase "the air supply passage is configured to exchange heat with the exhaust passage" means that the air supply passage and the exhaust passage need not contact each other but may be spaced apart from each other by a distance within which the gas in the air supply passage and the gas in the exhaust passage can exchange heat between them. Therefore, the air supply passage and the exhaust passage may be provided such that there is a space between them. Or, at an inner side of one of the air supply passage and the exhaust passage, the other may be provided. That is, a pipe defining the air supply passage and a pipe defining the exhaust passage may be constituted to have a double-wall-pipe structure.

[Configuration of Power Generation System]

Figure 6:
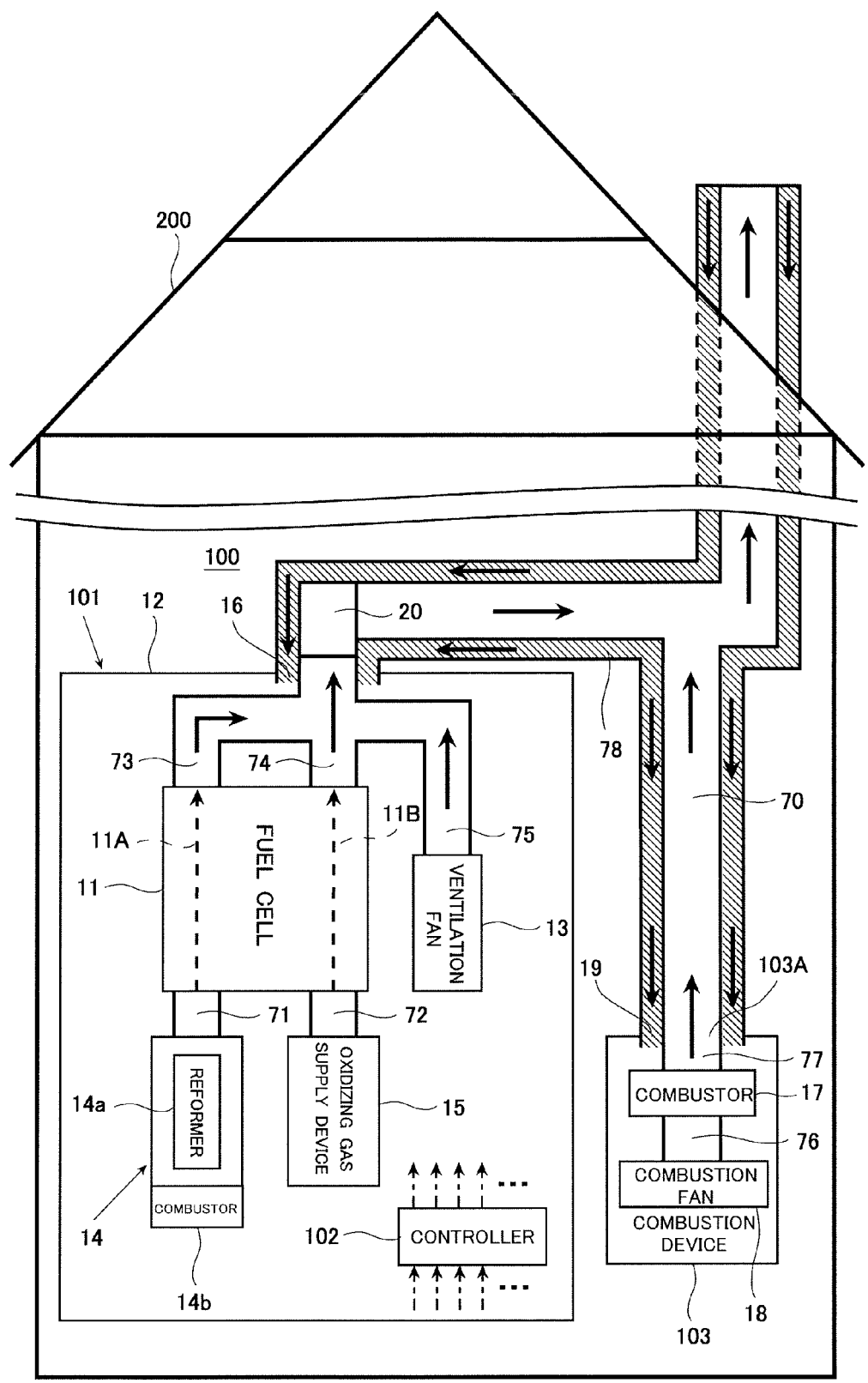
FIG. 6 is a schematic view showing a configuration of a power generation system according to Embodiment 3.

FIG. 6 is a schematic view showing a configuration of a power generation system according to Embodiment 3. In FIG. 6, the air supply passage is hatched.

As shown in FIG. 6, a power generation system 100 according to Embodiment 3 has basically the same configuration as that of the power generation system according to Embodiment 1, except that an air supply passage 78 is provided in the power generation system 100 according to Embodiment 3. To be specific, the air supply passage 78 provides communication between the combustion device 103 and the casing 12 in the fuel cell system 101, supplies air from outside (in Embodiment 3, outside of the building 200) to the fuel cell system 101 and to the combustion device 103, and surround an outer periphery of the exhaust passage 70. That is, the air supply passage 78 and the exhaust passage 70 have a double-wall-pipe structure.

To be more specific, the air supply passage 78 branches and two upstream ends are connected to the hole 16 and the hole 19, respectively. The air supply passage 78 extends to outside of the building 200, and its downstream end (opening) is open to atmosphere. Thus, the air supply passage 78 provides communication between the combustion device 103 and the casing 12 to allow the air from outside of the power generation system 100 to be supplied to the fuel cell system 101 and to the combustion device 103.

The power generation system 100 according to Embodiment 3 configured as described above can achieve the same advantages as those of the power generation system 100 according to Embodiment 1.

Embodiment 4

A power generation system according to Embodiment 4 further includes a hydrogen generator including a reformer for generating a hydrogen-containing gas from a raw material and steam, a combustor configured to heat the reformer, and a combustion air supply device for supplying combustion air to the combustor.

[Configuration of Power Generation System]

Figure 7:
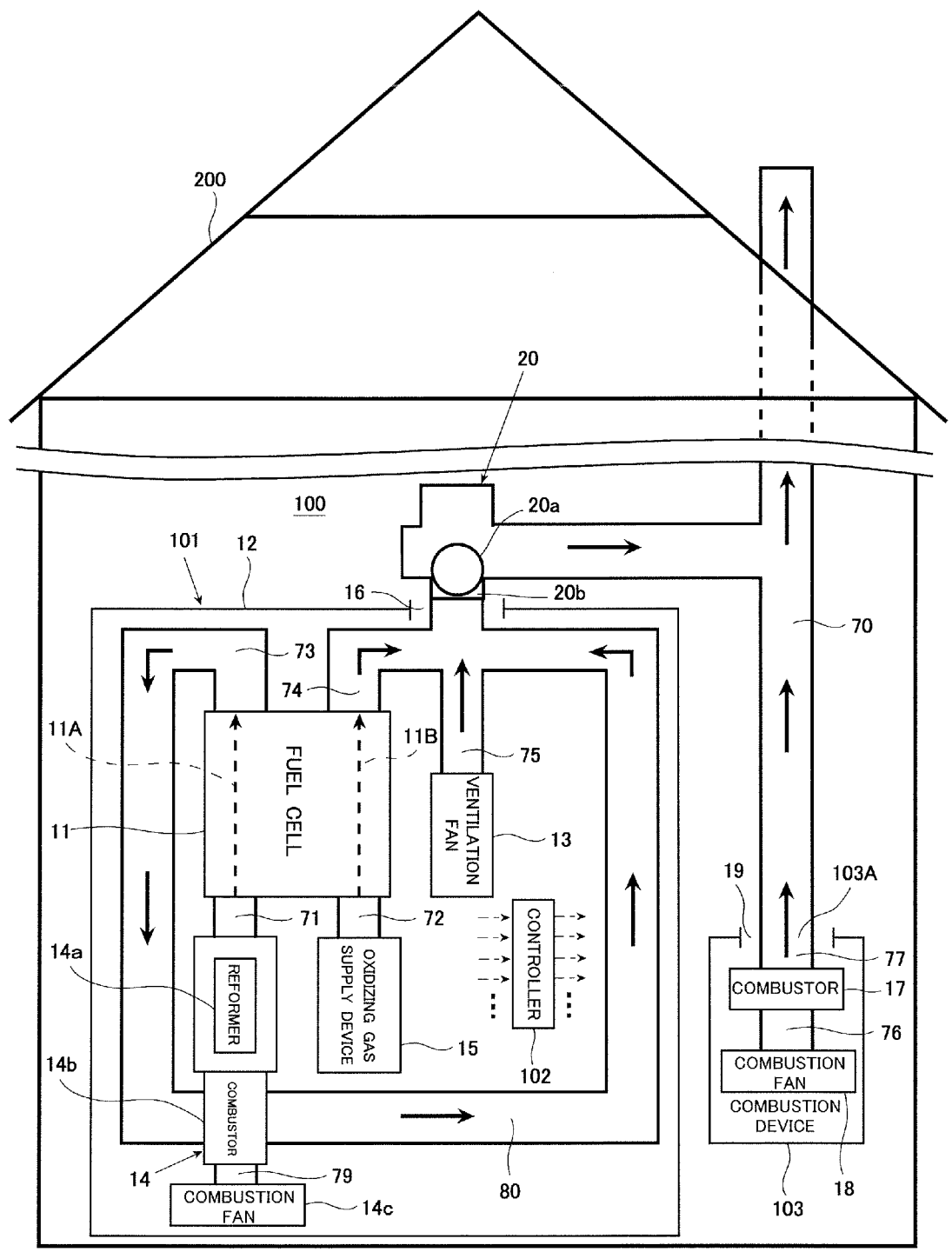
FIG. 7 is a schematic view showing a configuration of a power generation system according to Embodiment 4.

FIG. 7 is a schematic view showing a configuration of the power generation system according to Embodiment 4.

As shown in FIG. 7, a power generation system 100 according to Embodiment 4 has basically the same configuration as that of the power generation system 100 according to Embodiment 1, except that the fuel gas supply device 14 is constituted by the hydrogen generator 14 and the off-fuel-gas passage 73 is connected to the combustor 14b of the hydrogen generator 14. To be specific, the hydrogen generator 14 includes the reformer 14a and the combustor 14b.

A downstream end of the off-fuel-gas passage 73 is connected to the combustor 14b. An off-fuel-gas is supplied as the combustion fuel from the fuel cell 11 through the off-fuel-gas passage 73. A combustion fan (combustion air supply device) 14c is connected to the combustor 14b via an air supply passage 79. The combustion fan 14c may have any configuration so long as it is able to supply the combustion air to the combustor 14b, and may be, for example, a fan component such as a fan or a blower.

The combustor 14b combusts the off-fuel-gas supplied and the combustion air to generate the combustion exhaust gas and heat. The combustion exhaust gas generated in the combustor 14b heats the reformer 14a, etc., and then is exhausted to a combustion exhaust gas passage 80. The combustion exhaust gas having been exhausted to the combustion exhaust gas passage 80 is exhausted to the exhaust passage 70 through the combustion exhaust gas passage 80. The combustion exhaust gas having been exhausted to the exhaust passage 70 is exhausted to outside of the power generation system 100 (building 200) through the exhaust passage 70.

A raw material supply device (not shown) and a steam supply device (not shown) are connected to the reformer 14a. The raw material and the steam are supplied to the reformer 14a. As the raw material, a natural gas containing methane as a major component, a LP gas containing propane as a major component, etc., may be used.

The reformer 14a has a reforming catalyst. As the reforming catalyst, any substances may be used as long as they act as a catalyst for catalyzing a steam reforming reaction for generating the hydrogen-containing gas from the raw material and the steam. For example, a ruthenium-based catalyst carrying ruthenium (Ru) on a catalyst carrier such as alumina, a nickel-based catalyst carrying nickel (Ni) on the same catalyst carrier, etc., may be used. As the reforming catalyst of the reformer 14a, a catalyst which allows an auto thermal reforming reaction to proceed may be used.

The reformer 14a generates the hydrogen-containing gas through the reforming reaction between the raw material and the steam. The generated hydrogen-containing gas flows as the fuel gas through the fuel gas supply passage 71, and is supplied to the fuel gas passage 11A of the fuel cell 11.

Although in Embodiment 2, the hydrogen-containing gas generated in the reformer 14a is supplied as the fuel gas to the fuel cell 11, the present invention is not limited to this. The hydrogen-containing gas having flowed through a shift converter having a shift catalyst (e.g., copper-zinc based catalyst) for reducing carbon monoxide in the hydrogen-containing gas output from the reformer 14a inside of the hydrogen generator 14, and a carbon monoxide removing device having an oxidation catalyst (e.g., ruthenium based catalyst) or a methanation catalyst (e.g., ruthenium based catalyst) inside of the hydrogen generator 14, may be output to the fuel cell 11.

A start-up operation of the fuel cell system 101 in the power generation system 100 according to Embodiment 4 is the same as the start-up operation of the fuel cell system 101 in the power generation system 100 according to Embodiment 1. Since the fuel gas supply device 14 is constituted by the hydrogen generator, the operation which occurs after the activation starting commands are output to the components in the fuel cell system 101 in step S104 is as follows.

In response to the activation starting command output from the controller 102, the combustion fan 14c supplies the combustion air to the combustor 14b. The combustor 14b is supplied with the combustion fuel (e.g., raw material gas) from the raw material supply device (not shown). The combustor 14b combusts the combustion fuel and the combustion air to generate the combustion exhaust gas. The combustion exhaust gas generated in the combustor 14b heats the reformer 14a, etc., then flows through the combustion exhaust gas passage 80 and the exhaust passage 70, and then is exhausted to outside of the building 200.

Then, the reformer 14a is supplied with the raw material (e.g., hydrocarbon such as natural gas) and the steam and generates the hydrogen-containing gas through the steam reforming reaction. The generated hydrogen-containing gas is supplied as the fuel gas to the fuel gas passage 11A of the fuel cell 11 through the fuel gas supply passage 71. The oxidizing gas supply device 15 supplies the oxidizing gas (air) to the oxidizing gas passage 11B via the oxidizing gas supply passage 72. Then, in the fuel cell 11, the fuel gas and the oxidizing gas are electrochemically reacted with each other to generate electricity and heat.

The fuel gas which has not been consumed in the fuel cell 11 is supplied to the combustor 14b through the off-fuel-gas passage 73. The oxidizing gas which has not been consumed in the fuel cell 11 is exhausted to outside of the building 200 through the off-fuel-gas passage 73 and the exhaust passage 70.

The power generation system 100 according to Embodiment 4 configured as described above can achieve the same advantages as those of the power generation system 100 according to Embodiment 1. In addition, since the interior of the casing 12 is ventilated, it becomes possible to suppress reduction of the oxygen concentration in the interior of the casing 12, suppress ignition failure in the combustor 14b of the hydrogen generator 14, and improve reliability of the power generation system 100.

Although in Embodiment 1 to Embodiment 4 (including modified example), the ventilation fan 13 is used as the gas supply device, the present invention is not limited to this. For example, as the gas supply device, the oxidizing gas supply device 15 may be used. In a case where the fuel gas supply device 14 is constituted by the hydrogen generator, and the hydrogen generator includes the combustor 14b and the combustion fan 14c, the combustion fan 14c may be used as the gas supply device.

Or, as the gas supply device, the ventilation fan 13 and the oxidizing gas supply device 15 may be used together. Or, the ventilation fan 13 and the combustion fan 14c may be used together. Or, the combustion fan 14c and the oxidizing gas supply device 15 may be used together. Or, the ventilation fan 13, the combustion fan 14c, and the oxidizing gas supply device 15 may be used together.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A power generation system and an operation method thereof of the present invention enable stable power generation, and therefore are useful in fields of fuel cells.

REFERENCE SIGNS LIST 11 fuel cell
11A fuel gas passage
11B oxidizing gas passage
12 casing
13 ventilation fan
14 fuel gas supply device
14a reformer
14b combustor
14c combustion fan
15 oxidizing gas supply device
16 intake port
17 combustor
18 combustion fan
19 intake port
70 exhaust passage
71 fuel gas supply passage
72 oxidizing gas supply passage
73 off-fuel-gas passage
74 off-oxidizing-gas passage
75 ventilation passage
76 combustion air supply passage
77 exhaust gas passage
78 air supply passage
79 air supply passage
80 combustion gas passage
100 power generation system
101 fuel cell system
102 controller
103 combustion device
103A exhaust port
200 building

The invention claimed is:

1. A power generation system comprising a fuel cell system including a fuel cell for generating electric power using a fuel gas and an oxidizing gas and a casing for accommodating the fuel cell, a gas supply device, and a controller;

the power generation system further comprising:
a combustion device;
an exhaust passage placed to provide communication between the casing and an exhaust port of the combustion device and configured to exhaust an exhaust gas exhausted from the fuel cell system and an exhaust gas exhausted from the combustion device, to atmosphere, through an opening leading to the atmosphere;
a gas passage which is provided with the gas supply device and used to supply a gas supplied from the gas supply device to the exhaust passage; and
a back-flow preventing device placed in the gas passage or the exhaust passage and including a valve seat and a valve element;
wherein the back-flow preventing device is configured such that the valve element moves away from the valve seat to permit the gas to flow in a direction from the casing to the opening of the exhaust passage, and the valve element contacts the valve seat to inhibit the gas from flowing in a direction from the opening of the exhaust passage to the casing and as a result to prevent the exhaust gas exhausted from the combustion device from flowing into the casing;
wherein the exhaust passage has a shape in which its upstream end branches into at least two parts to be connected to the exhaust port of the combustion device and to the casing;
wherein the back-flow preventing device is placed in a location closer to the casing than a point where the upstream end of the exhaust passage branches; and
wherein during a shut-down state or at start-up of the fuel cell system, the controller executes an operation for relieving the state in which the valve element remains incapable of moving away from the valve seat in such a manner that the gas supply device is operated so that a differential pressure between an upstream side and a downstream side of the back-flow preventing device reaches a value which is equal to or greater than a predetermined value which can relieve the state in which the valve element remains incapable of moving away from the valve seat in the back-flow preventing device.

2. The power generation system according to claim 1, wherein during an operation of the fuel cell system, the controller operates the fuel cell system under a condition in which the differential pressure is lower than the predetermined value which can relieve the state in which the valve element remains incapable of moving away from the valve seat in the back-flow preventing device;
and wherein during the shut-down state or at start-up of the fuel cell system, the controller executes the operation for relieving the state in which the valve element remains incapable of moving away from the valve seat.

3. The power generation system according to claim 1, wherein when the controller controls the gas supply device so that an output pressure of the gas supply device becomes higher when the operation for relieving the state in which the valve element remains incapable of moving away from the valve seat is executed during an activated state of the combustion device than when the operation for relieving the state in which the valve element remains incapable of moving away from the valve seat is executed during a deactivated state of the combustion device.

4. The power generation system according to claim 1, further comprising:
an operation detector for detecting an activated state or a deactivated state of the combustion device;
wherein during the shut-down state of the fuel cell system, when the operation detector detects the activated state of the combustion device, the controller controls the gas supply device to execute the operation for relieving the state in which the valve element remains incapable of moving away from the valve seat.

5. The power generation system according to claim 4,
wherein when the operation detector detects the activated state of the combustion device again in a period that passes from when the operation for relieving the state in which the valve element remains incapable of moving away from the valve seat has been executed until start-up of the fuel cell system starts, the controller controls the gas supply device to execute again the operation for relieving the state in which the valve element remains incapable of moving away from the valve seat; and
when the operation detector does not detect the activated state of the combustion device, the controller does not execute again the operation for relieving the state in which the valve element remains incapable of moving away from the valve seat.

6. The power generation system according to claim 1, further comprising:
a hydrogen generator including a reformer for generating a hydrogen-containing gas from a raw material and steam; a combustor configured to heat the reformer, and a combustion air supply device for supplying combustion air to the combustor;
wherein the gas supply device is at least one of a ventilation device configured to exhaust a gas from inside of the casing to the exhaust passage, an oxidizing gas supply device configured to supply the oxidizing gas to the fuel cell and exhaust the oxidizing gas to the exhaust passage, and the combustion air supply device.

7. The power generation system according to claim 1, further comprising:
an oxidizing gas supply device configured to supply the oxidizing gas to the fuel cell and exhaust the oxidizing gas to the exhaust passage;
wherein the gas supply device is a ventilation device configured to exhaust the gas from inside of the casing to the exhaust passage; and
wherein the controller activates the ventilation device to execute the operation for relieving the state in which the valve element remains incapable of moving away from the valve seat, and then activates the oxidizing gas supply device.

8. The power generation system according to claim 1, further comprising:
a hydrogen generator including a reformer for generating a hydrogen-containing gas from a raw material and steam; a combustor configured to heat the reformer; and a combustion air supply device for supplying combustion air to the combustor;
wherein the gas supply device is a ventilation device configured to exhaust the gas from inside of the casing to the exhaust passage; and
wherein the controller activates the ventilation device to execute the operation for relieving the state in which the valve element remains incapable of moving away from the valve seat, and then activates the combustor.

9. The power generation system according to claim 1, wherein the controller executes the operation for relieving the state in which the valve element remains incapable of moving away from the valve seat in such a manner that the controller causes the gas supply device to intermittently supply the gas from inside of the casing to the back-flow preventing device.

10. A method of operating a power generation system comprising a power generation system comprising a fuel cell system including a fuel cell for generating electric power using a fuel gas and an oxidizing gas and a casing accommodating the fuel cell, a gas supply device, and a controller; the power generation system further comprising:

a combustion device;

an exhaust passage placed to provide communication between the casing and an exhaust port of the combustion device and configured to exhaust an exhaust gas exhausted from the fuel cell system and an exhaust gas exhausted from the combustion device, to atmosphere, through an opening leading to the atmosphere;

a gas passage which is provided with the gas supply device and used to supply a gas supplied from the gas supply device to the exhaust passage; and a back-flow preventing device placed in the gas passage or the exhaust passage and including a valve seat and a valve element;

wherein the back-flow preventing device is configured such that the valve element moves away from the valve seat to permit the gas to flow in a direction from the casing to the opening of the exhaust passage, and the valve element contacts the valve seat to inhibit the gas from flowing in a direction from the opening of the exhaust passage to the casing and as a result to prevent the exhaust gas exhausted from the combustion device from flowing into the casing;

wherein the exhaust passage has a shape in which its upstream end branches into at least two parts to be connected to the exhaust port of the combustion device and to the casing;

wherein the back-flow preventing device is placed in a location closer to the casing than a point where the upstream end of the exhaust passage branches; and wherein during a shut-down state or at start-up of the fuel cell system, the gas supply device is operated so that a differential pressure between an upstream side and a downstream side of the back-flow preventing device reaches a value which is equal to or greater than a predetermined value which can relieve a state in which the valve element remains incapable of moving away from the valve seat in the back-flow preventing device.

* * * * *